No. 646,965. Patented Apr. 10, 1900.
C. FERM.
DRAFT EQUALIZER.
(Application filed June 13, 1899.)
(No Model.)
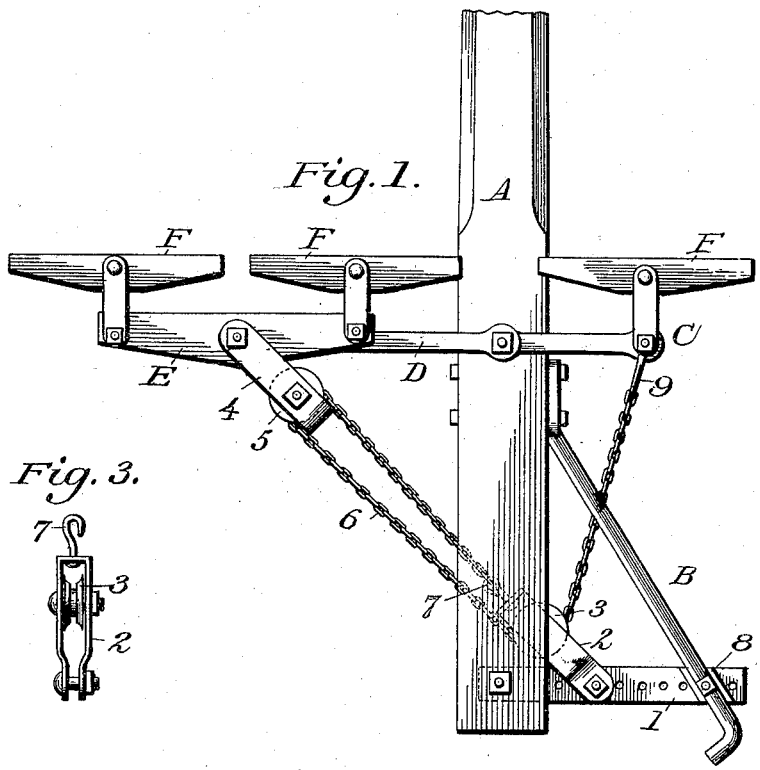
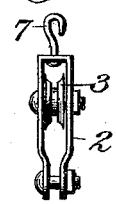
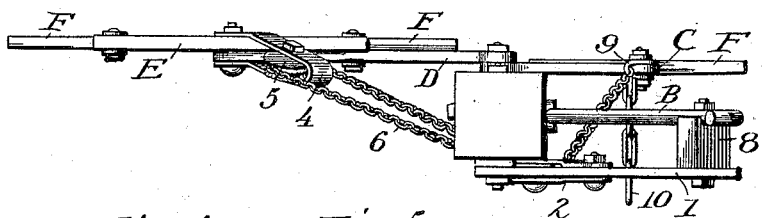
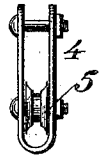
Witnesses.
Frank Lindberg
H. O. Olson
Inventor.
Charles Ferm

UNITED STATES PATENT OFFICE.

CHARLES FERM, OF LINDSBORG, KANSAS.

DRAFT-EQUALIZER.

SPECIFICATION forming part of Letters Patent No. 646,965, dated April 10, 1900.

Application filed June 13, 1899. Serial No. 720,435. (No model.)

*To all whom it may concern:*

Be it known that I, CHARLES FERM, a citizen of the United States, residing at Lindsborg, in the county of McPherson and State of Kansas, have invented a new and useful improvement in equalizing the draft upon three horses that walk abreast in the pulling of a self-binder or harvester-machine, of which the following is a specification.

When three horses are used to work abreast in the pulling of a self-binder, one horse walks next to the grain and two horses on the off side from the grain. By the "off" side I mean the side of the tongue that is away from the grain. On a right-hand cut the off side is to the left of the tongue and on a left-hand cut the off side is to the right side of the tongue. The sickle or knife that cuts the grain extends six feet or more beyond the near horse. The resistance of the grain upon the sickle tends to pull the tongue toward the grain. This sidewise pulling is called "side draft." The grouping of two horses on the off side when at work tends to aggravate this side draft. The usual method at present employed by manufacturers of harvester-machines is to adjust the tongue as close to the knife as possible. This again throws the near horse right onto the side of the grain to be cut, making the double or singletree to extend into the grain beyond where the horse walks. When now the off team steps up and the near horse steps back, this movement throws the singletree of the near horse into the reel that gathers the standing grain upon the knife or sickle there to be cut. This throws foreign matter upon the reel, which is thereby endangered to being broken. To prevent breakage, there is a catch knob or notch on lever attached to doubletrees and tongue, intended to catch on the tongue to prevent the slipping back of the near horse into the reel, so as to save the reel from being broken. This catching on tongue throws all the work on one team, doubles the side draft, and breaks the neck and shoulders of the horses. Having the fulcrum of draft attached to the top or up side of the tongue adds neck weight to the horses.

All harvester-machines are now so made and adjusted that when idle, with man in seat, there is an even balance, (when the machine is evenly balanced.) When the machine is at work, in order to do good work it is necessary to tilt the machine forward in order to get an even elevation of the grain. This adds weight on the necks of the horses, called "neck" weight. To take away this neck weight, it is necessary to have pulling apparatus below or underneath the tongue.

My invention relates to the enabling of the manufacturer to so attach the tongue to the machine that the near horse can have free play to step back and forth in his work without endangering the reel, and thus to take away, first, the catch on tongue; second, the side draft; third, the neck weight, and, fourth, to enable the operator to adjust the machine to the work to be done. I attain these objects by the mechanism illustrated in the accompanying drawings.

Figure 1 is a top view of the entire machine. Fig. 2 is an end view. Fig. 3 is a side view of block 2. Fig. 4 is a side view of block 4. Fig. 5 is a top view of filler 8.

The self-binder and harvester is not shown, neither are the horses. We must suppose their places to be filled for the purposes to be attained.

The invention connects only direct with the tongue A, brace B, spreaders C D, doubletree E, and singletree F.

Similar letters refer to similar parts. All letters refer to parts belonging to the harvester-machine.

All figures refer to those parts which are my invention. Similar figures refer to similar parts throughout all the views.

By extending the draft from the center of the tongue by stationary and perforated extension I, made fast to brace B by bolt through brace B, by block 2, fastened unto extension I by bolt, by pulley 3, playing in block 2, by hook 7, playing in said block 2, by chain 6, fastened to hook 7 and playing over pulley 5, which again is playing over bolt in said block 4, being fastened by bolt to spreader D and doubletree E by again chain 6, running under tongue and over pulley 3 in said block 2, running up and attached to clevis 9, which again is fastened or attached to spreader C and singletree F, spreaders C and D being fastened at their inner ends to tongue, as set forth. This takes away all side draft, all neck weight, all catch on tongue, and equalizes the work upon the three horses alike, permitting them to work easy back and forth.

1 is a straight perforated piece of iron attached to tongue A and brace B, as shown in the drawings. It serves the purpose of moving the fulcrum from the center of the tongue to the center of the weight to be levered.

2 is a block to be attached to extension I, and is adjustable thereon as the work of the machine requires such adjustment.

4 is a block, as shown in Fig. 4, with pulley 5 therein, attached to doubletree E and spreader D.

6 is a chain attached to hook 7, (see Fig. 3,) as appears in Fig. 1 by dotted lines under tongue, running over pulley 5 in block 4, again running under tongue and over pulley 3 in block 2, running under brace B up to clevis 9 and attached thereto, which again is attached to spreader C and singletree F. This connects all parts and serves as the connecting link between all parts of the invention.

9 is a common clevis and serves the purpose of connecting chain 6 to spreader C and singletree F.

10 are four large links attached to chain 6 and hanging loose underneath clevis 9, as shown in Fig. 2. These links serve the purpose of lengthening the chain when that is required by the extension of the draft away from the tongue as the work of the machine requires such adjustment.

8 is a filler between extension I and brace B. It serves the purpose of a rest for extension I, with bolt through it. Extension I and brace B make it rigid and, through extension I, tongue A, and brace B, transmit the pull to the self-binder or harvester-machine.

The principle of the working of my invention is to transmit the pull to the harvester-machine direct from brace B and through said brace B to tongue A, and through tongue A keeping the self-binder in the right position, thus getting the pull the closest possible to the work to be done.

All the parts described are connected together and coöperate to produce the useful results.

I claim—

1. In draft-equalizers, a pole A provided with a stationary and perforated extension I, a block 2 attached thereto having a pulley 3 therein and hook 7, attached or made fast in said block, a chain 6, attached to said block 2, at hook 7, running over pulley 5, in block 4, said block 4, being attached to doubletree E, and spreader D, at its outer end, its inner end being attached to pole A, said chain 6 running over pulley 3, under tongue A, and brace B, to clevis 9, and attached thereto, which clevis is again attached to singletree F and spreader C at its outer end which again is attached to pole A, at its inner end, all combined as set forth.

2. In draft-equalizers, the pole A, carrying a perforated extension I, attached to brace B, and supporting-block 2, which is adjustable on said extension, said block 2, carrying a pulley 3, and hook 7, a chain 6 attached to said hook, a block 4, having a pulley 5 therein attached to pole A, through spreader D, said chain 6, playing over pulley 3, to clevis 9, said clevis 9, having adjustable links 10, attached thereto for adjustable purposes said clevis 9, being attached to chain 6, spreader C, which again is attached to pole A, and again attached to singletree F, all combined as set forth.

CHARLES FERM.

Witnesses:
 FRANK LINDBERG,
 H. O. OLSON.